US010445921B1

(12) United States Patent
Li et al.

(10) Patent No.: US 10,445,921 B1
(45) Date of Patent: Oct. 15, 2019

(54) TRANSFERRING MOTION BETWEEN CONSECUTIVE FRAMES TO A DIGITAL IMAGE

(71) Applicant: Adobe Inc., San Jose, CA (US)

(72) Inventors: Yijun Li, Merced, CA (US); Chen Fang, Sunnyvale, CA (US); Jimei Yang, Mountain View, CA (US); Zhaowen Wang, San Jose, CA (US); Xin Lu, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/007,898

(22) Filed: Jun. 13, 2018

(51) Int. Cl.
*G06T 13/80* (2011.01)
*G06T 7/246* (2017.01)

(52) U.S. Cl.
CPC .............. *G06T 13/80* (2013.01); *G06T 7/248* (2017.01); *G06T 2207/10004* (2013.01); *G06T 2207/10016* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS 6,717,607 B1 * 4/2004 Lauper .................. H04N 7/142
348/14.08

OTHER PUBLICATIONS

Denton,"Unsupervised Learning of Disentangled Representations from Video", May 31, 2017, 13 pages.
Johnson,"Perceptual Losses for Real-Time Style Transfer and Super-Resolution.", Mar. 27, 2016, 18 pages.
Ranjan,"Optical Flow Estimation using a Spatial Pyramid Network", Nov. 21, 2016, 10 pages.
Villegas,"Decomposing Motion and Content for Natural Video Sequence Prediction", Jan. 8, 2018, 22 pages.

* cited by examiner

*Primary Examiner* — Said Broome
(74) *Attorney, Agent, or Firm* — SBMC

(57) ABSTRACT

Transferring motion between consecutive frames to a digital image is leveraged in a digital medium environment. A digital image and at least a portion of the digital video are exposed to a motion transfer model. The portion of the digital video includes at least a first digital video frame and a second digital video frame that is consecutive to the first digital video frame. Flow data between the first digital video frame and the second digital image frame is extracted, and the flow data is then processed to generate motion features representing motion between the first digital video frame and the second digital video frame. The digital image is processed to generate image features of the digital image. Motion of the digital video is then transferred to the digital image by combining the motion features with the image features to generate a next digital image frame for the digital image.

20 Claims, 13 Drawing Sheets

1200

1202
Expose, by at least one computing device, a first digital image frame and a second digital image frame to a motion transfer model that combines a motion predictor and a motion transferor, the second digital image frame consecutive to the first digital image frame

1204
Generate, by the motion predictor, predicted motion between the second digital image frame and a next digital image frame based on the first digital image frame and the second digital image frame

1206
Transfer, by the motion transferor, the predicted motion to the second digital image frame to generate a next digital image frame

*Fig. 12*

TRANSFERRING MOTION BETWEEN CONSECUTIVE FRAMES TO A DIGITAL IMAGE

BACKGROUND

A graphic interchange format (better known as GIF) is an image file format that can be animated by combining multiple images or frames into a single file. The multiple images within a single GIF file can then be displayed in succession to create an animated clip or a short movie. By default, animated GIFs display the sequence of images only once, stopping when the last image or frame is displayed, although it can also loop endlessly or stop after a few sequences.

In some cases, a user may wish to create a GIF from a single still image, by applying motion to the image to turn the single image into an animated GIF. One conventional way to generate a GIF from a single image, is to first use a flow estimation method to obtain the flow information between the consecutive frames of a video, and then directly apply the feed-forward warping to the given digital image. However, such a method will usually result in discontinuous artifacts and black holes in the rendered result. Alternatively, a different conventional technique employs a recurrent network to encode the image difference as motions but is demonstrated to be ineffective on natural scene data because image difference is hard to depict the temporal dynamic changes. Another conventional technique uses a network to encode motions, but extracts the motion from a single frame, which thus resembles a pose instead of motion. Further, these conventional techniques deal with rigid objects, such as moving digits or human bodies and are not well-equipped to deal with challenging natural scene data, such as clouds, fire, water, and wind.

SUMMARY

To overcome these problems, transferring motion between consecutive frames to a digital image is leveraged in a digital medium environment. In one or more implementations, a motion transfer model is configured to transfer motion from a digital video to a digital image. To do so, the digital image and at least a portion of the digital video are exposed to a motion transfer model that combines an image feature extractor, a flow estimator, and a motion feature extractor. The portion of the digital video includes at least a first digital video frame and a second digital video frame that is consecutive to the first digital video frame. Flow data between the first digital video frame and the second digital image frame is extracted by a flow estimator, and the flow data is then processed by the motion feature extractor to generate motion features representing motion between the first digital video frame and the second digital video frame. The digital image is processed by the image feature extractor to generate image features of the digital image. Motion of the digital video is then transferred to the digital image by combining the motion features with the image features to generate a next digital image frame for the digital image.

In one or more implementations, the motion transfer model is configured to generate next digital image frames given at least two initial digital image frames. To do so, a first digital image frame and a second digital image frame that is consecutive to the first digital image frame are exposed to a motion transfer model that combines a motion predictor and a motion transferor. Predicted motion between the second digital image frame and a next digital image frame is generated by the motion predictor based on the first digital image frame and the second digital image frame. The predicted motion is then transferred, by the motion transferor, to the second digital image frame to generate a next digital image frame.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 12 depicts an example procedure of synthesizing future digital image frames given at least two initial digital image frames.

DETAILED DESCRIPTION

Overview

Figure 1:
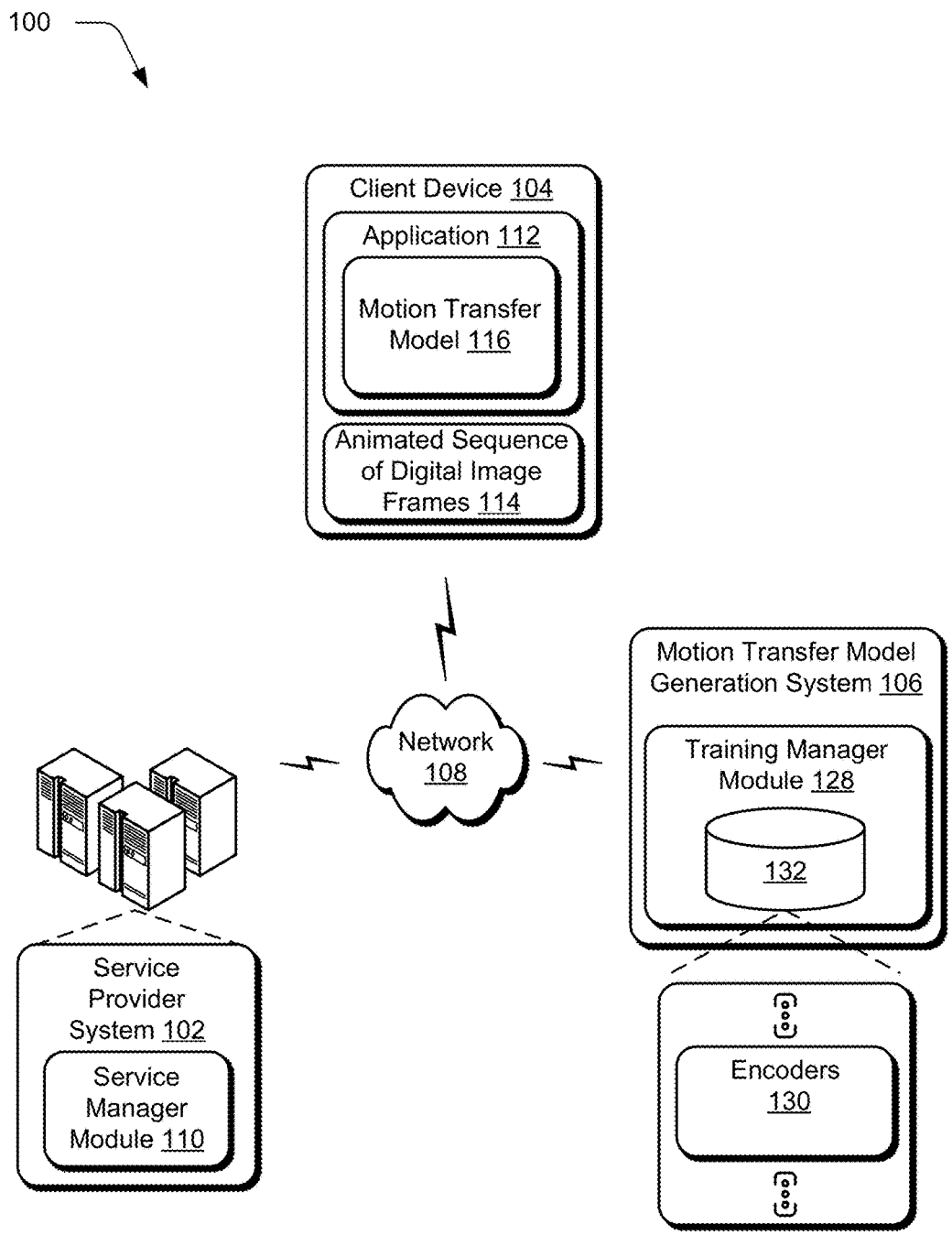
FIG. 1 is an illustration of an environment in an example implementation that is operable to employ transferring motion between consecutive frames to a digital image as described herein.

To overcome these problems, transferring motion between consecutive frames to a digital image is leveraged in a digital medium environment. In one or more implementations, a motion transfer model is implemented as a deep convolutional neural network to transfer motion of a digital "reference" video to a still digital image. The described motion transfer model is both effective and efficient for fast motion transfer and is capable of transferring motion to complicated natural scene data (e.g., clouds, fire, water, and wind) which contains more randomness and uncertainties than common rigid objects. The motion transfer model is designed as an end-to-end generative neural network. Doing so enables the motion transfer model to apply consistent motions from a given video to the digital image in order to generate visually-pleasing results.

The motion transfer model is configured to extract motion from consecutive frames of a digital video, and transfer the motion to an initial digital image frame of a still digital image to generate one or more next digital image frames. The initial digital image frame can then be combined with one or more of the generated next digital image frames to form an animated sequence of images, such as a GIF. The motion transfer model is trained using machine learning by transferring motion between two consecutive frames of a digital video to the starting frame of the same digital video. Once trained, however, the motion transfer model can be applied to transfer motion from a digital video to a digital image which is not part of the "reference" digital video.

To ensure that the motion extracted from the digital video corresponds to motion that can be transferred to the digital image, a digital video is selected which is visually similar to the digital image. For example, motion can be extracted from a video of a fire and applied to a digital image of a fire to generate subsequent frames of the fire. In some cases, the digital video is selected which includes a desired motion to be applied to the digital image.

The motion transfer model is configured to extract features from both the digital image and consecutive frames of the digital video separately. The motion transfer model extracts motion features from the digital video using a two-step process. To do so, a flow estimator receives the digital video, and extracts flow data between the first digital video frame and the second digital video frame. The flow data corresponds to a flow, or change, between the first digital video frame and the second digital video frame, which is representative of motion of the digital video.

Next, the flow data is processed by the motion feature extractor to generate motion features representing motion between the first digital video frame and the second digital video frame. Extracting the flow data first, enables the flow data to be encoded by the motion feature extractor without regard to the content of the digital video. Doing so disentangles the extracted motion features from the content of the consecutive frames of the digital video. In a parallel process, the motion transfer model extracts features from the digital image. To do so, the image feature extractor processes the digital image to generate image features of the digital image.

Motion of the digital video is then transferred to the digital image by combining the motion features with the image features to generate a next digital image frame for the digital image. This process may be performed iteratively by the motion transfer model to generate additional next digital image frames. For example, the next digital image frame (x2') that is generated by the motion transfer model can then be passed to the image feature extractor, while the second digital video frame and the third digital video frame are passed to the flow estimator and motion feature extractor to generate motion features between the second digital video frame and the third digital video frame. These motion features are then applied to the generated next digital image frame (x2') to generate an additional next digital image frame (x3'). This process may then be repeated to generate any desired number of next digital image frames.

Alternately or additionally, given at least two initial digital image frames (x1,x2), the motion transfer model can be implemented to synthesize one or more future digital image frames, e.g., x3, x4, x5, and so forth. The initial digital image frames may comprise two still digital images, consecutive frames of a digital video, or consecutive frames of a sequence of images, such as a GIF. Unlike conventional single network systems which directly hallucinate pixel value of future frames, the described techniques decompose this procedure into two stages: a motion prediction stage and a motion transfer stage. The motion prediction stage and motion transfer stage is implemented by the motion transfer model using a motion predictor and a motion transferor, respectively. Generally, the motion predictor predicts motion between the second digital image frame and a next digital image frame (which does not currently exist), while the motion transferor transfers the predicted motion to the second digital image frame to generate the next digital image frame (e.g., x3). Such a design is more intuitive and consistent with the notion of first knowing how to move and then synthesizing the result after the movement.

Moreover, unlike conventional techniques which use a single neural network to predict motion and hallucinate pixels by transferring the predicted motion in the pixel space, the described techniques transfer the motion in the feature space and then use a decoder to generate the next digital image in the pixel space. Doing so enables the generation of a sharp, visually pleasing next digital image. Moreover, the motion predictor and the motion transferor may each be implemented as a separate neural network. As such, the motion predictor and the motion transferor can be trained separately using machine learning which alleviates the learning burdens to separate neural networks. Doing so enables more reasonable motion prediction, which leads to the synthesis of more visually-pleasing future frames.

In a first stage, the motion predictor receives a first digital image frame (x1) and a second digital image frame (x2) and generates predicted motion (x2,x3) between the second digital image frame and a next digital image frame, e.g., a third digital image frame (x3). Generally, the predicted motion corresponds to an optical flow between the second digital image frame and a third digital image frame which has not yet been generated, and is thus considered a "future" frame. To do so, a flow estimator of the motion predictor, extracts flow data between the first digital video frame and the second digital image frame, and a first encoder processes the flow data to generate motion features representing motion between the first digital video frame and the second digital video frame. In a separate process, the second digital image frame is processed by a second encoder of the motion predictor to generate image features of the second digital image. Then, the predicted motion between the second digital image file and the third digital image file is generated by combining the motion features with the image features. Thus, the predicted motion is conditioned on the second digital image frame.

Next, the motion transferor receives the predicted motion, and transfers the predicted motion to the second digital image frame to generate a next frame, e.g., the third digital image frame (x3). To do so, an encoder of the motion transferor obtains the predicted motion between x2 and x3 that was generated by motion predictor, and processes the predicted motion to generate motion features representing motion between the second digital image frame and the next digital image frame (x3). A different encoder of the motion transferor obtains the second digital image frame, and processes the second digital image frame to generate image features of the second digital image frame. Then, the next digital image frame is generated by combining the motion features with the image features of the second digital image frame to generate the next digital image frame. Notably, this process may be performed iteratively by the motion predictor and the motion transferor to generate subsequent future digital image frames using previously generated future frames.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ transferring motion between consecutive frames to a digital image as described herein. The illustrated environment 100 includes a service provider system 102, client device 104, and a motion transfer model generation system 106 that are communicatively coupled, one to another, via a network 108.

Computing devices that are usable to implement the service provider system 102, client device 104, and motion transfer model generation system 106 may be configured in a variety of ways. A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 13.

The service provider system 102 is illustrated as including a service manager module 110 that is representative of functionality to provide services accessible via the network 108 to client device users. The service manager module 110, for instance, may expose content or functionality that is accessible via the network 108 by an application 112 of the client device 104. The application 112 may be configured as a network-enabled application, a browser, a native application, and so on, that obtains data from the service provider system 102 via the network 108. This data can be employed by the application 112 to enable a user of the client device 104 to communicate with the service provider system 102, such as to receive application updates and features when the service provider system 102 provides functionality to manage content editing applications.

In the context of the described techniques, the application 112 includes functionality to edit digital content, such as to generate an animated sequence of digital image frames 114 (e.g. a GIF). In the illustrated example, the application 112 includes a motion transfer model 116 that is implemented at least partially in hardware of the client device 104, to generate the animated sequence of digital image frames 114. In a first implementation, the animated sequence of digital image frames 114 is generated by transferring motion between consecutive frames of a digital "reference" video to a target digital image to generate a next digital image. In a second implementation, given at least two initial digital image frames (x1,x2), the motion transfer model 116 generates one or more future digital image frames, e.g., x3, x4, x5, and so forth.

In one or more implementations, the motion transfer model 116 is a machine-learning model (e.g., a neural network) trained using deep learning. In other words, the motion transfer model 116 may be configured as a fully convolutional end-to-end neural network that takes as input consecutive frames and a target digital image and outputs a next digital image frame. This process may then be sequentially repeated in order to generate a desired number of next digital image frames. The target image and the next digital image frame, in combination, form the animated sequence of digital image frames 114.

To provide the client device 104 with the application 112 having the motion transfer model 116, the service provider system 102 may leverage the motion transfer model generation system 106. Although functionality of the motion transfer model generation system 106 is illustrated as separate from the service provider system 102, this functionality may also be incorporated as part of the service provider system 102, further divided among other entities, and so forth. Additionally or alternately, an entirety or portions of the functionality of the motion transfer model generation system 106 may be incorporated as part of the client device 104. The motion transfer model generation system 106 includes a training manager module 128 that is implemented at least partially in hardware of a computing device, in part, to deploy deep learning to generate encoders 130, which are illustrated in storage 132. These encoders 130 may then be utilized by the motion transfer model 116 to generate next digital image frames.

In one or more implementations, the training manager module 128 configures the motion transfer model 116 with two parallel encoders—a first encoder that generates motion features representing motion between consecutive frames, and a second encoder that generates image features of the target image. The training manager module 128 merges the results of these two encoders to produce the next digital image frame.

The motion transfer model 116 can be trained by the motion transfer model generation system, using machine learning, by utilizing consecutive frames of a digital video and one of the digital video frames of the digital video as the digital image (x1). The motion transfer model 116 can be trained specifically for a category of images, such as natural scene categories corresponding to clouds, fire, water, and wind. Although other categories area also contemplated. In this scenario a training data set is collected for each category, such as by obtaining a video dataset from Adobe Stock®. Each category may be trained using a multitude of videos and frames extracted from the video. For instance, a single category could be trained using 400 digital videos which may include over 30,000 frames. During the training, motion is detected between two consecutive frames (x1, x2) of a digital video, and then the motion is transferred to the starting frame (x1) of the digital video to generate x2'. Notably, in the training scenario, the digital image is from the same digital video.

Transferring Motion from a Digital Video to a Digital Image

Figure 2:
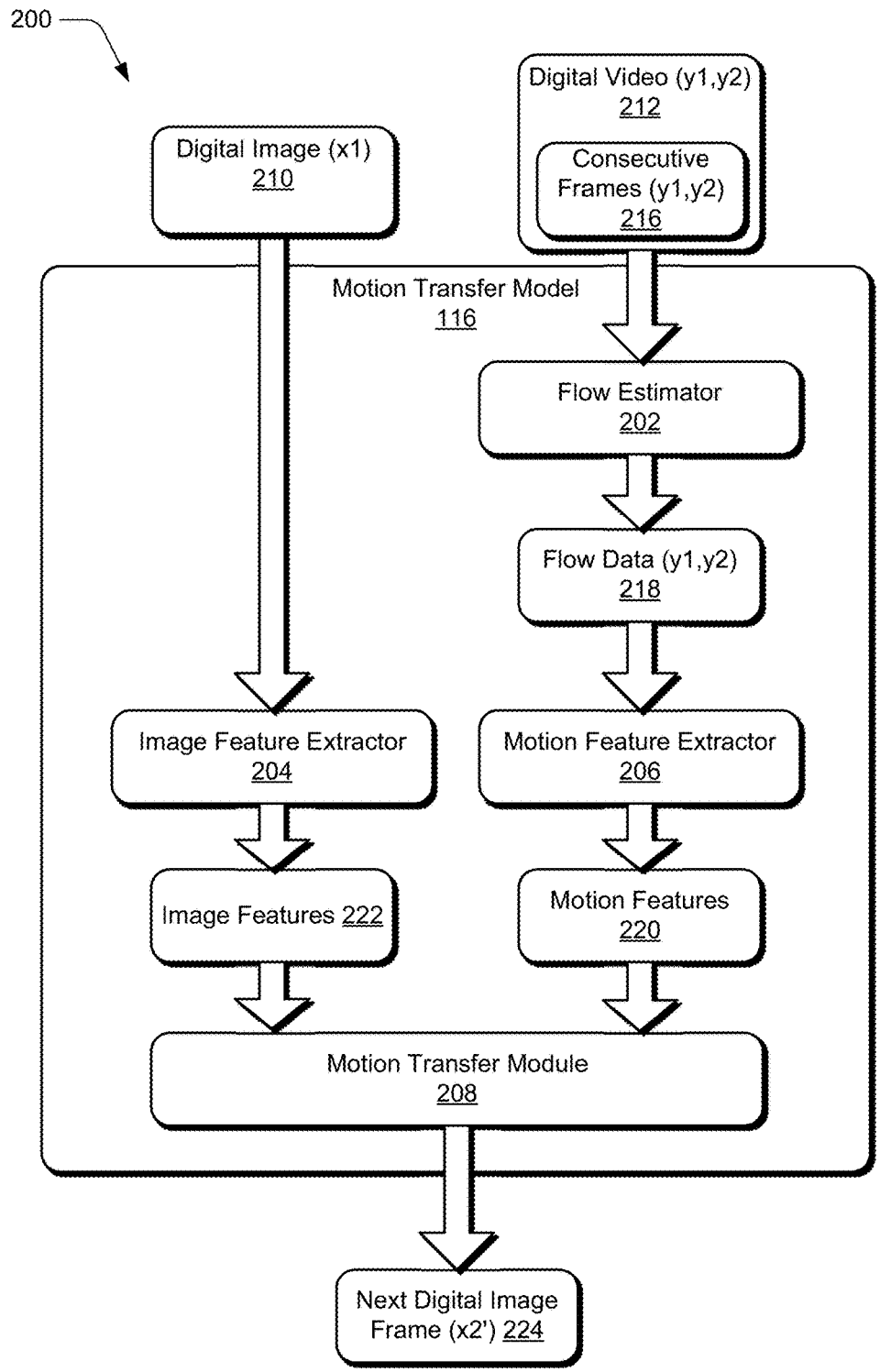
FIG. 2 depicts a system in an example implementation in which motion of a digital video is transferred to a digital image to generate a next digital image frame for the digital image using the motion transfer model of FIG. 1.

FIG. 2 depicts a system 200 in an example implementation in which motion of a digital video is transferred to a digital image to generate a next digital image frame for the digital image using the motion transfer model 116 of FIG. 1.

In this example 200, the motion transfer model 116 is depicted as including a flow estimator 202, an image feature extractor 204, a motion feature extractor 206, and a motion transfer module 208. The motion transfer model 116 receives two streams of input, a still digital image 210 and at least a portion of a digital video 212. In this example, the digital image 210 includes an initial digital image frame (x1), while the portion of the digital video 212 includes at least two consecutive frames 216 (y1,y2), which correspond to consecutive frames of the digital video 212. Generally, the motion transfer model 116 is configured to extract motion from the consecutive frames 216 of the digital video 212, and transfer the motion to the digital image 210 to generate one or more next digital image frames. The initial digital image (x1) can then be combined with one or more of the generated next digital image frames to form an animated sequence of digital images, such as a GIF.

To ensure that the motion extracted from the digital video 212 corresponds to motion that can be transferred to the still digital image 210, a digital video 212 is selected which is visually similar to the digital image 210. In some cases, both the digital image 210 and the digital video 212 may be manually selected by a user of client device 104. Alternately, in at least some implementations, one or more image recognition techniques may be utilized to recognize the digital image 210, and then automatically select a visually similar digital video 212 based on the recognized visual image.

The motion transfer model 116 is configured to extract features from both the digital image 210 and consecutive frames 216 of the digital video 212 separately. The motion transfer model 116 extracts motion features from the digital video 212 using a two-step process. To do so, the flow estimator 202 obtains the digital video 212, and extracts flow data 218 from the consecutive frames 216 of the digital video 212. The flow data 218 corresponds to a flow, or change, between the first frame (y1) and second consecutive frame (y2) of the digital video 212, which is representative of motion between the frames of the digital video. Next, the flow feature extractor 206 extracts motion features 220 from the flow data 218. Extracting the flow data 218 first, enables the flow data 218 to be encoded by the flow feature extractor 206 without regard to the content of the digital video 212. Doing so disentangles the extracted motion features from the content of the consecutive frames 216 of the digital video 212.

In a separate process, the motion transfer model 116 extracts features from the digital image 210. To do so, the image feature extractor 204 obtains the digital image 210, and extracts image features 222. Finally, the motion transfer module 208 transfers motion of the digital video 212 (e.g., between consecutive frames y1 and y2) to the digital image 210 by combining the motion features 220 with the image features 222 to generate a next digital image frame 224 (x2') for the digital image 210. The digital image 210 can then be combined, in sequence, with the next digital image frame to form an animated sequence of digital images (e.g., a GIF).

This process may be performed iteratively by the motion transfer model 116 to generate additional next digital image frames. For example, in a second iteration, the image feature extractor 204 generates image features for the next digital image frame 224 (x2'), while the flow estimator 202 and motion feature extractor 206 generate motion features representing motion between consecutive frames y2 and y3 of the digital video 212. Thus, the motion transfer model 116 may repeat this process to generate a desired number of next digital image frames.

Figure 3:
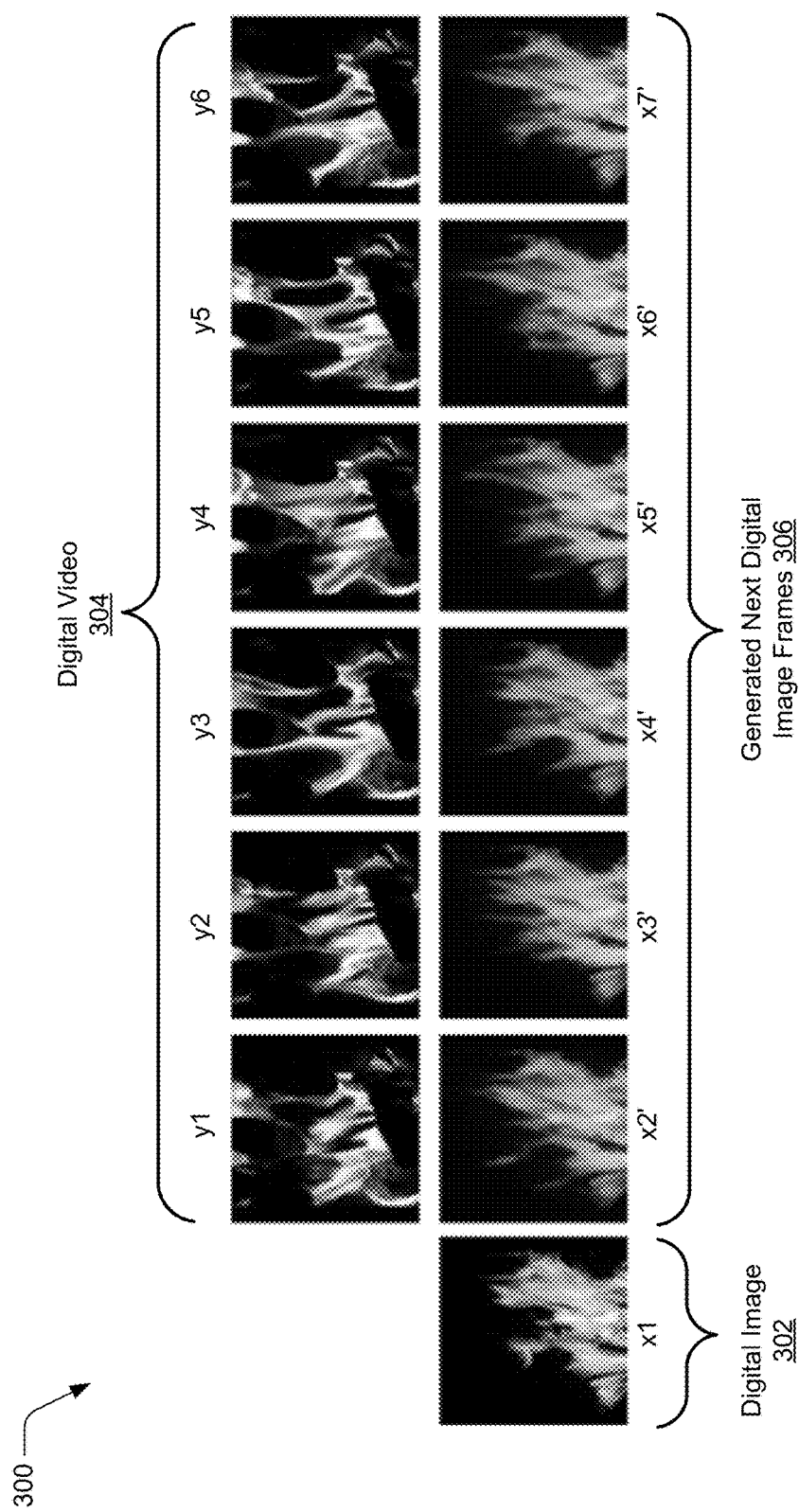
FIG. 3 depicts an example of transferring motion from a digital video to a digital image.

By way of example, consider FIG. 3 which depicts an example 300 of transferring motion from a digital video to a digital image. In example 300, a digital image 302 corresponds to a still image of a fire, and a digital video 304 is selected, which corresponds to a video of a fire, and thus includes motion of a fire. In this example, digital video 304 includes frames y1, y2, y3, y4, y5, and y6. The digital image 302 and digital video 304 are exposed to the motion transfer model 116. Using the techniques described in system 200, the motion transfer model 116 extracts image features from the digital image 302 (x1) and motion features from frames y1 and y2 of the digital video 304, and then combines the extracted features to generate a next digital image frame 306 (x2') using the system described in FIG. 2.

This process can then be iteratively performed by the motion transfer model 116 to generate subsequent digital image frames. For example, the motion transfer model 116 extracts digital image features from digital image frame x2 and motion features from frames y2 and y3 of the digital video 304, and then combines the extracted features to generate a next digital image frame x3'. Next, the motion transfer model 116 extracts digital image features from digital image frame x3' and motion features from frames y3 and y4 of the digital video 304, and then combines the extracted features to generate a next digital image frame x4'. Next, the motion transfer model 116 extracts digital image features from digital image frame x4' and motion features from frames y4 and y5 of the digital video 304, and then combines the extracted features to generate a next digital image frame x5'. This process continues for the desired number of digital image frames.

Figure 4:
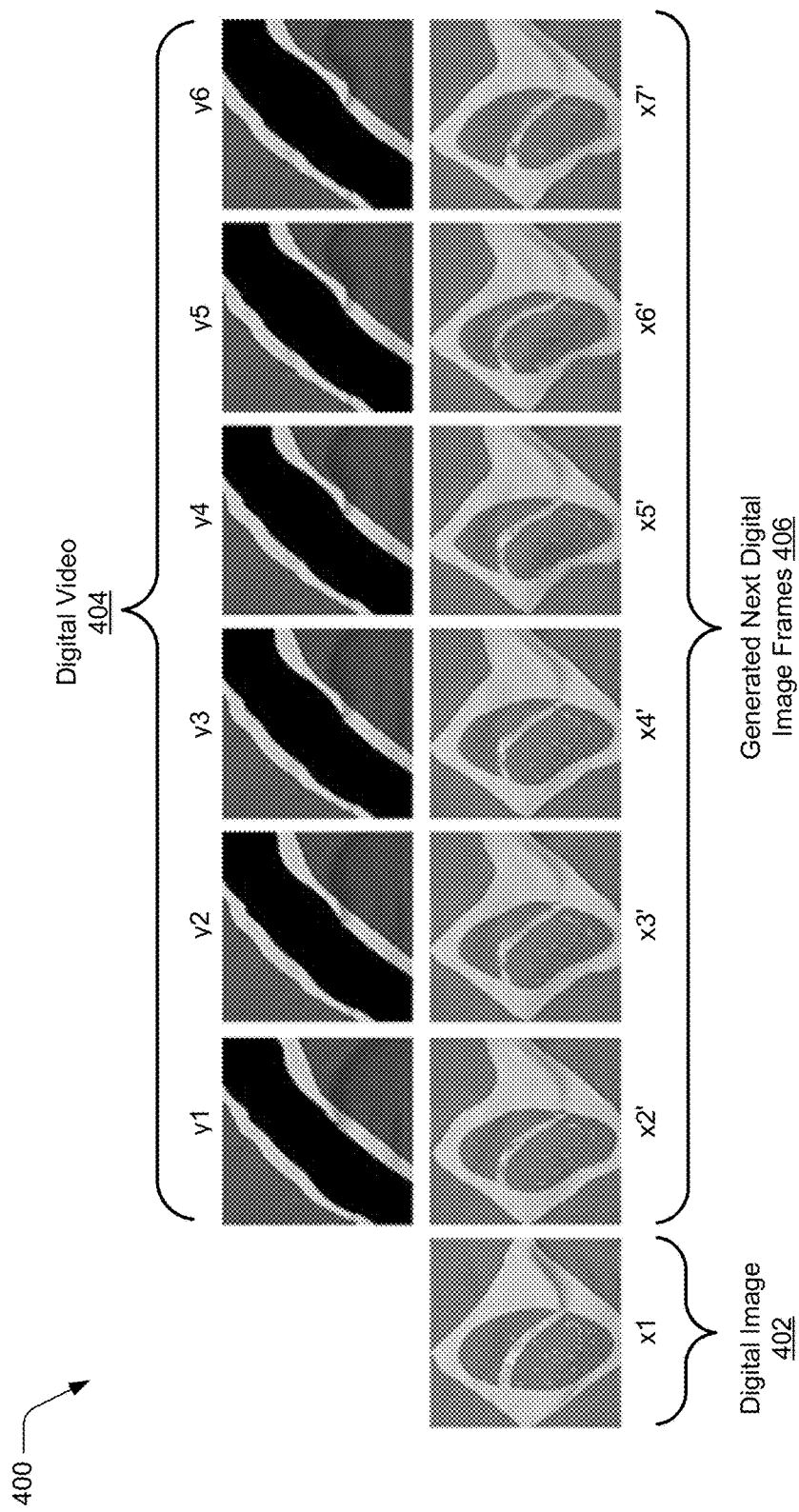
FIG. 4 depicts an additional example of transferring motion from a digital video to a digital image.

As another example, consider FIG. 4 which depicts an additional example 400 of transferring motion from a digital video to a digital image. In example 400, a digital image 402 corresponds to a still image of a flag, and a digital video 404 is selected, which corresponds to a video of a flag blowing in the wind, and in this example includes frames y1, y2, y3, y4, y5, and y6. The digital image 402 and digital video 404 are passed to the motion transfer model 116. Using the techniques described in system 200, the motion transfer model 116 extracts digital image features from the digital image 402 (x1) and motion features from frames y1 and y2 of the digital video 404, and then combines the extracted features to generate a next digital image frame 406 (x2') using the system described in FIG. 2.

This process can then be iteratively performed to generate subsequent digital image frames. For example, the motion transfer model 116 extracts digital image features from digital image frame x2 and motion features from frames y2 and y3 of the digital video 404, and then combines the extracted features to generate a next digital image frame x3'. Next, the motion transfer model 116 extracts digital image features from digital image frame x3' and motion features from frames y3 and y4 of the digital video 404, and then combines the extracted features to generate a next digital image frame x4'. Next, the motion transfer model 116 extracts digital image features from digital image frame x4' and motion features from frames y4 and y5 of the digital video 404, and then combines the extracted features to generate a next digital image frame x5'. This process continues for the desired number of digital image frames.

Figure 5:
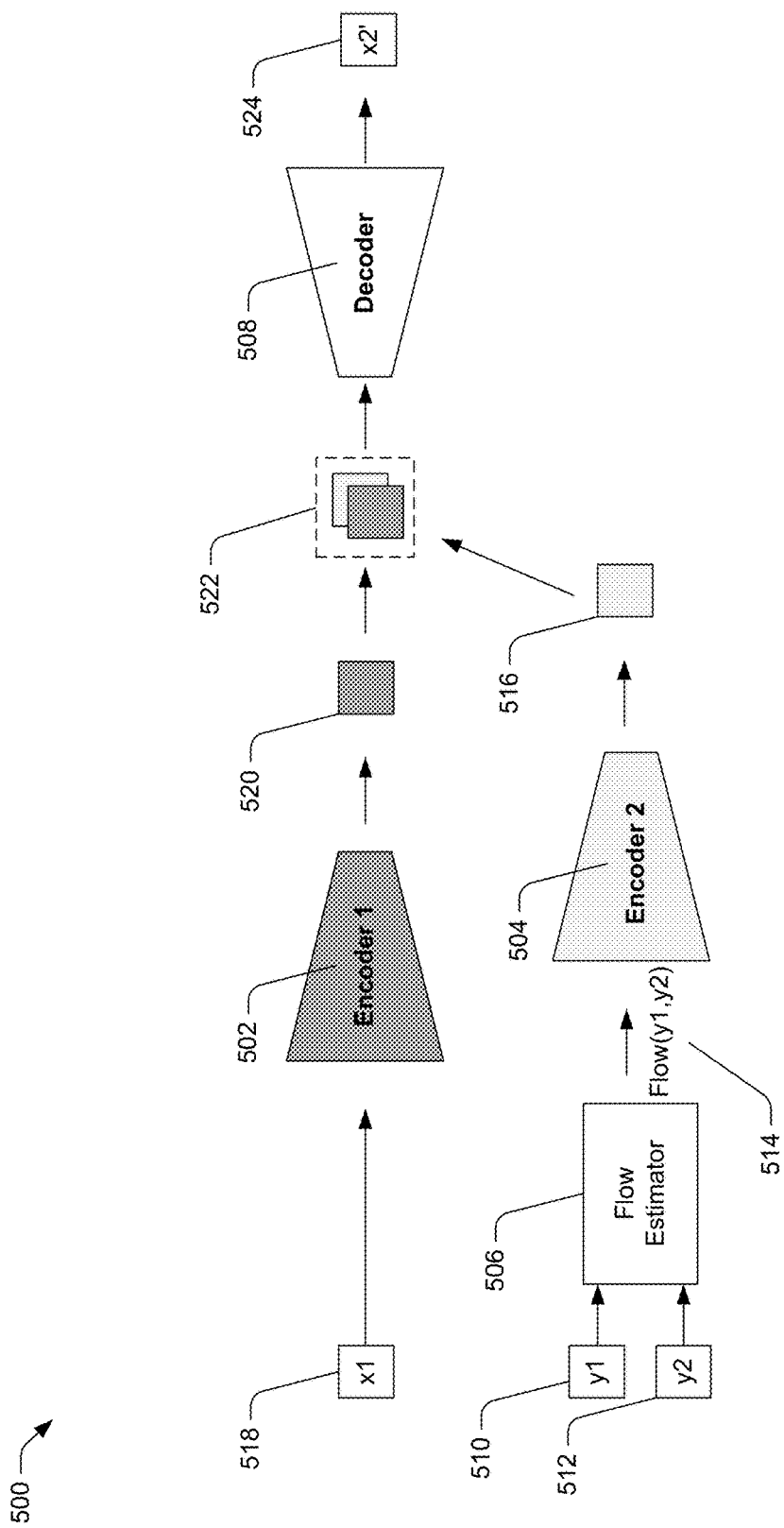
FIG. 5 illustrates an example in which the motion transfer model, as configured in FIG. 2, is implemented as an end-to-end convolutional neural network.

FIG. 5 illustrates an example 500 in which the motion transfer model 116 of FIG. 2 is implemented as an end-to-end convolutional neural network. In this example, the image feature extractor 204 is depicted as a first encoder 502, the motion feature extractor 206 is depicted as a second encoder 504, the flow estimator 202 is depicted as a flow estimator 506, and the motion transfer module 208 is depicted as a decoder 508. Consecutive frames 510 and 512 of a digital video are obtained by flow estimator 506. Flow estimator 506 extracts flow data 514 from the consecutive frames 510 and 512 of the digital video. The flow data 514 corresponds to a flow, or change, between the first frame (y1) and second frame (y2) of the digital video 212, which is representative of motion of the digital video. In one or more implementations, the flow estimator 506 is a SpyNet flow estimator. SpyNet is a pre-trained network for flow estimation and is configured to extract the flow data 514 between y1 and y2, while eliminating the content information at the same time. In addition, since the SpyNet is network-based, this enables the entire convolutional neural network to remain as an end-to-end network.

Next, encoder 504 encodes the flow data 514 to generate motion features 516 the flow feature extractor 206 extracts motion features 220 from the flow data 218. In a separate process, the first encoder 502 obtains a digital image 518, and extracts image features 520 from the digital image 518. The motion features 516 and image features 520 are concatenated to generate concatenated features 522, and the concatenated features 522 are fed into the decoder 508. The decoder 508 decodes the concatenated features 522 to generate a next digital image frame 524. At the loss end, the standard L2 reconstruction loss and perceptual loss between the generated next digital image frame x2' and the ground truth x2 is minimized.

In this example, encoders 502 and 504 are a series of convolutional layers which map an input image or flow from the pixel space to high dimensional feature maps in the feature space. The high dimensional feature maps in the feature space are then concatenated, and then the decoder (which is also a set of convolutional layers) decodes it by mapping the high dimensional feature maps in the feature layer back to the pixel space. Thus, the motion transfer occurs in feature space, and then is mapped back to the pixel space by the decoder. As described throughout, this process may be performed iteratively by the motion transfer model 116 to generate additional next digital image frames.

Figure 6:
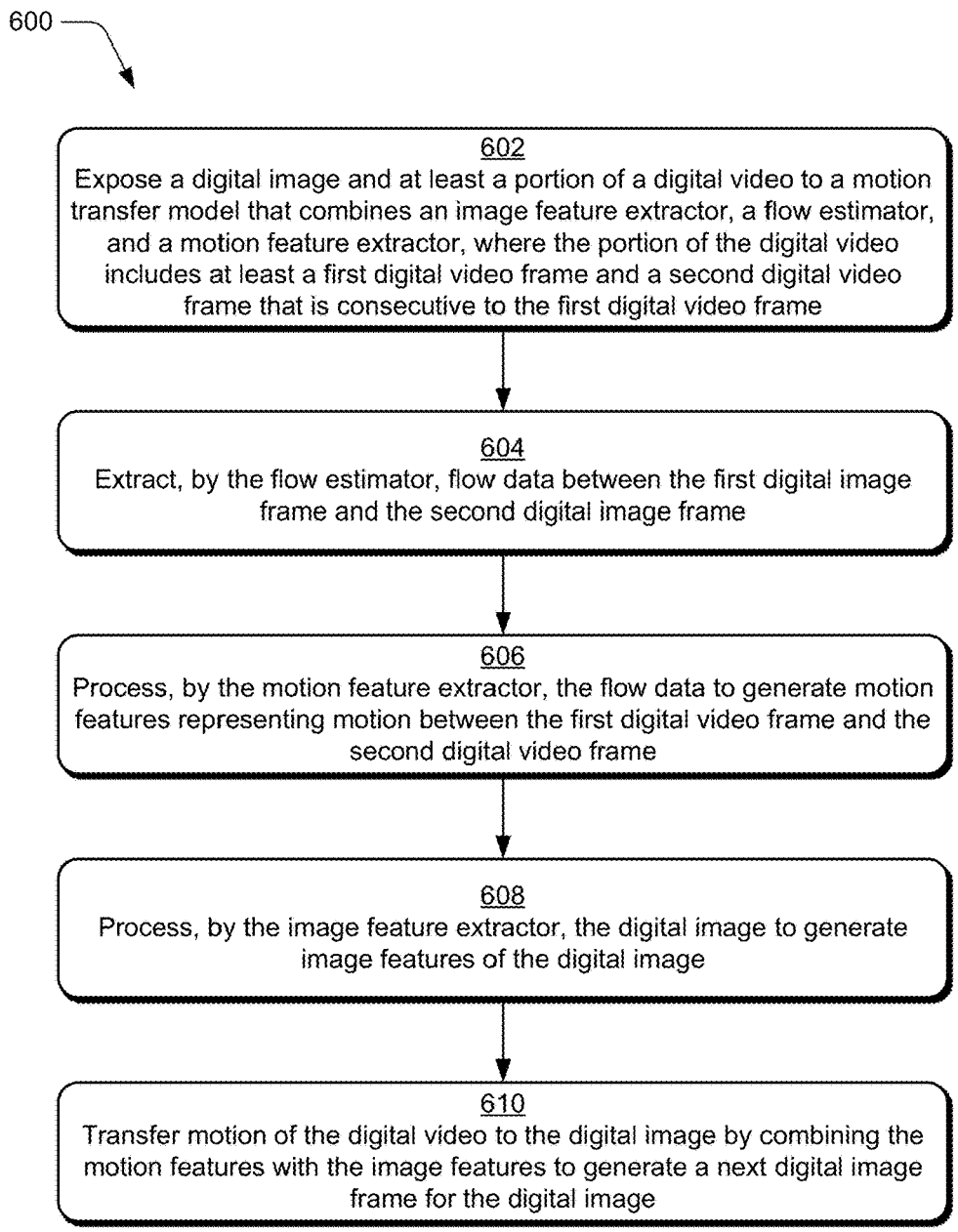
FIG. 6 depicts an example procedure of transferring motion from a digital video to a digital image to generate a next digital image frame for the digital image.

FIG. 6 depicts an example procedure 600 of transferring from a digital video to a digital image to generate a next digital image frame for the digital image. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

A digital image and at least a portion of the digital video are exposed to a motion transfer model that combines an image feature extractor, a flow estimator, and a motion feature extractor, where the portion of the digital video includes at least a first digital video frame and a second digital video frame that is consecutive to the first digital video frame (block 602). By way of example, a still digital image 210 and at least a portion of a digital video 212 are exposed to a motion transfer model that combines a flow estimator 202, an image feature extractor 204, and a flow feature extractor 206. In this example, the digital image 210 includes an initial digital image frame x1, while the portion of the digital video 212 includes at least two consecutive frames 216 (y1,y2), which correspond to consecutive frames of the digital video 212. To ensure that the motion extracted from the digital video 212 corresponds to motion that can be transferred to the still digital image 210, a digital video 212 is selected which is visually similar to the digital image 210.

Flow data between the first digital video frame and the second digital image frame is extracted by a flow estimator (block 604), and the flow data is processed by a motion feature extractor to generate motion features representing motion between the first digital video frame and the second digital video frame (block 606). By way of example, the motion transfer model 116 extracts motion features from the digital video 212 using a two-step process. To do so, the flow estimator 202 obtains the digital video 212, and extracts flow data 218 from the consecutive frames 216 of the digital video 212. The flow data 218 corresponds to a flow, or change, between the first frame (y1) and second consecutive frame (y2) of the digital video 212, which is representative of motion between the frames of the digital video. Next, the motion feature extractor 206 extracts motion features 220 from the flow data 218. Extracting the flow data 218 first, enables the flow data 218 to be encoded by the motion feature extractor 206 without regard to the content of the digital video 212. Doing so disentangles the extracted motion features from the content of the consecutive frames 216 of the digital video 212.

The digital image is processed, by the image feature extractor, to generate image features of the digital image (block 608). For example, in a separate process, the motion transfer model 116 extracts features from the digital image 210. To do so, the image feature extractor 204 obtains the digital image 210, and extracts image features 222.

Motion of the digital video is transferred to the digital image by combining the motion features with the image features to generate a next digital image frame for the digital image (block 610). By way of example, the motion transfer module 208 transfers motion of the digital video 212 (e.g., between consecutive frames y1 and y2) to the digital image 210 by combining the motion features 220 with the image features 222 to generate a next digital image frame 224 (x2') for the digital image 210. The digital image 210 can then be combined, in sequence, with the next digital image frame to form an animated sequence of images (e.g., a GIF). As described throughout, this process may be performed iteratively by the motion transfer model 116 to generate additional next digital image frames.

Synthesizing Future Digital Image Frames

Figure 7:
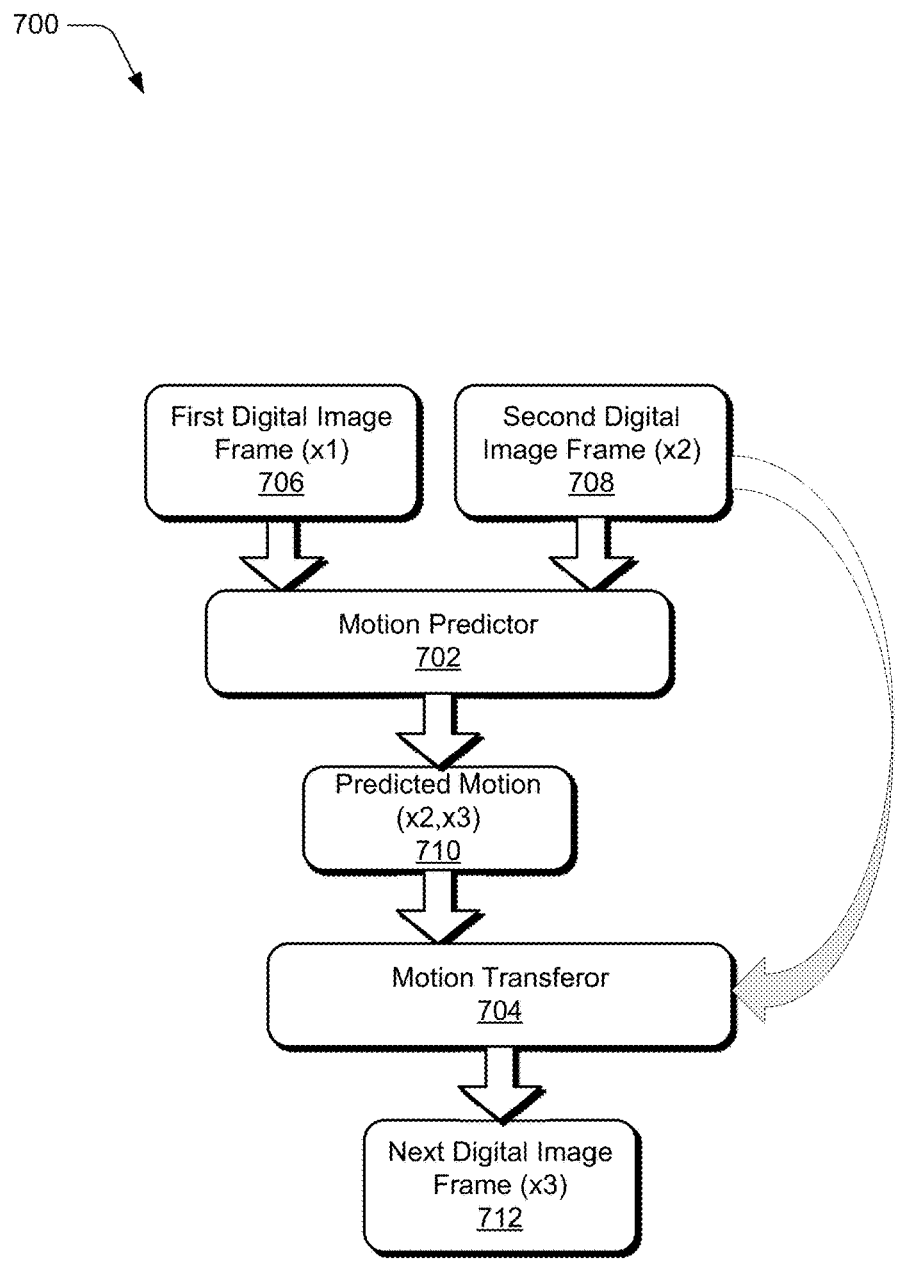
FIG. 7 depicts a system in an example implementation in which the motion transfer model of FIG. 1 synthesizes one or more future digital image frames given at least two initial digital image frames.

FIG. 7 depicts a system 700 in an example implementation in which the motion transfer model 116 of FIG. 1 synthesizes one or more future digital image frames given at least two initial digital image frames.

In system 700, given at least two initial digital image frames (x1,x2), the motion transfer model 116 synthesizes one or more future digital image frames, e.g., x3, x4, x5, and so forth. The initial digital image frames may comprise two still digital images, consecutive frames of a digital video, or consecutive frames of a sequence of images, such as a GIF. Instead of directly hallucinating pixels of future frames, the future frame prediction problem is decomposed into two stages: a motion prediction stage and a motion transfer stage. In this example, the motion prediction stage and motion transfer stage is implemented by the motion transfer model 116 of FIG. 1 using a motion predictor 702 and a motion transferor 704, respectively. Generally, the motion predictor 702 predicts motion between the second digital image frame and a next digital image frame (which does not currently exist), while the motion transferor 704 transfers the predicted motion to the second digital image frame to generate the next digital image frame (e.g., x3).

Moreover, unlike conventional techniques which use a single neural network to predict motion and hallucinate pixels by transferring the predicted motion in the pixel space, the described techniques transfer the motion in the feature space and then use a decoder to generate the next digital image in the pixel space. Doing so enables the generation of a sharp, visually pleasing next digital image. Moreover, the motion predictor 702 and the motion transferor 704 may each be implemented as a separate neural network. As such, the motion predictor 702 and the motion transferor 704 can be trained separately using machine learning which alleviates the learning burdens to separate neural networks. Doing so enables more reasonable motion prediction, which leads to the synthesis of more visually-pleasing future frames.

In a first stage, the motion predictor 702 receives a first digital image frame 706 (x1) and a second digital image frame 706 (x2) and generates predicted motion 710 (x2,x3) between the second digital image frame and a next digital image frame, e.g., a third digital image frame (x3). Generally, the predicted motion corresponds to an optical flow between the second digital image frame and a third digital image frame which has not yet been generated, and is thus considered a "future" frame. To do so, a flow estimator of the motion predictor, extracts flow data between the first digital video frame and the second digital image frame, and a first encoder processes the flow data to generate motion features representing motion between the first digital video frame and the second digital video frame. In a separate process, the second digital image frame is processed by a second encoder of the motion predictor to generate image features of the second digital image. Then, the predicted motion between the second digital image file and the third digital image file is generated by combining the motion features with the image features. Thus, the predicted motion is conditioned on the second digital image frame.

Next, the motion transferor 704 receives the predicted motion 710, and transfers the predicted motion 710 to the second digital image frame 708 to generate a next digital image frame 712, e.g., the third digital image frame (x3). To do so, an encoder of the motion transferor obtains the predicted motion 710 between x2 and x3 that was generated by motion predictor 702, and processes the predicted motion 710 to generate motion features representing motion between the second digital image frame and the next digital image frame 712 (x3). A different encoder of the motion transferor obtains the second digital image frame 708, and processes the second digital image frame 708 to generate image features of the second digital image frame 708. Then, the next digital image frame 712 is generated by combining the motion features with the image features of the second digital image frame to generate the next digital image frame 712.

Figure 8:
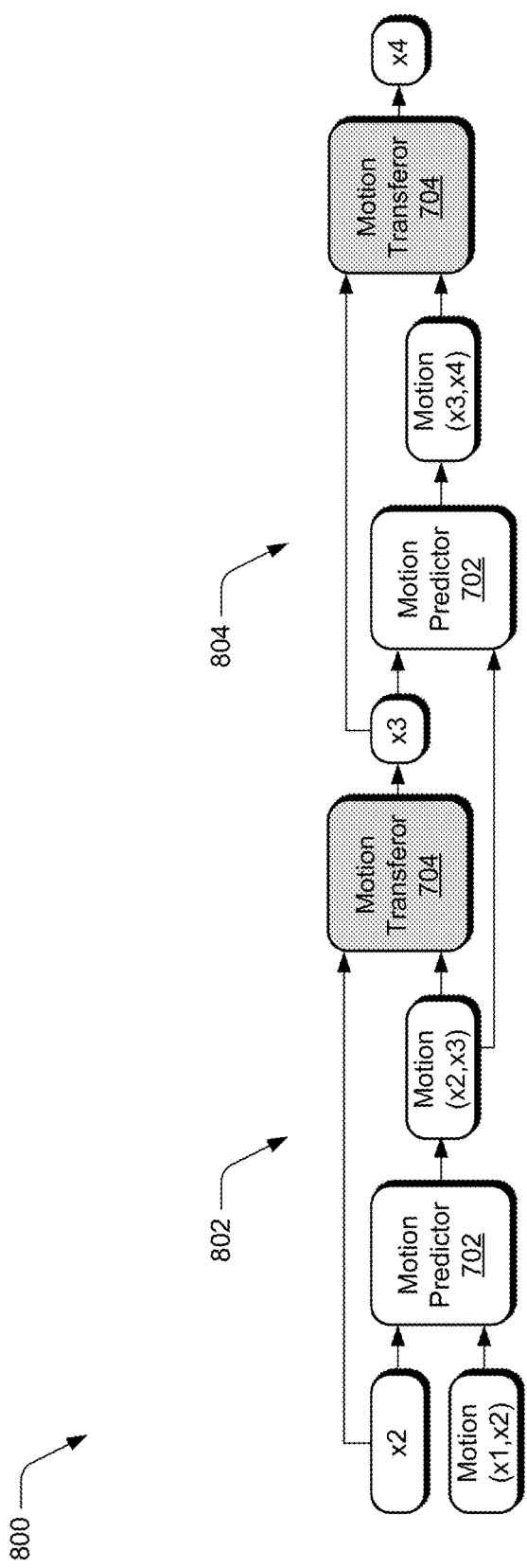
FIG. 8 illustrates an example of synthesizing future digital image frames given at least two initial digital image frames.

Notably, this process may be performed iteratively by the motion predictor and the motion transferor 704 to generate subsequent future digital image frames using previously generated future frames. Consider, for example, FIG. 8 which illustrates an example 800 of synthesizing future digital image frames. In this example, during a first iteration 802, starting from two digital image frames (x1, x2), predicted motion between x2 and x3 is predicted by the motion predictor 702. This motion transferor 704 then transfers the predicted motion to the second digital image frame (x2) to generate next digital image frame (x3). Next, during a second iteration 804, this process is repeated by starting with the predicted motion between x2 and x3 and the previously generated next digital image frame x3, to generate next digital image frame x4. In subsequent iterations (not pictured), this process is repeated using the previously generated results to progressively synthesize a desired number of future digital image frames, such as x5, x6, x7, and so forth.

Figure 9:
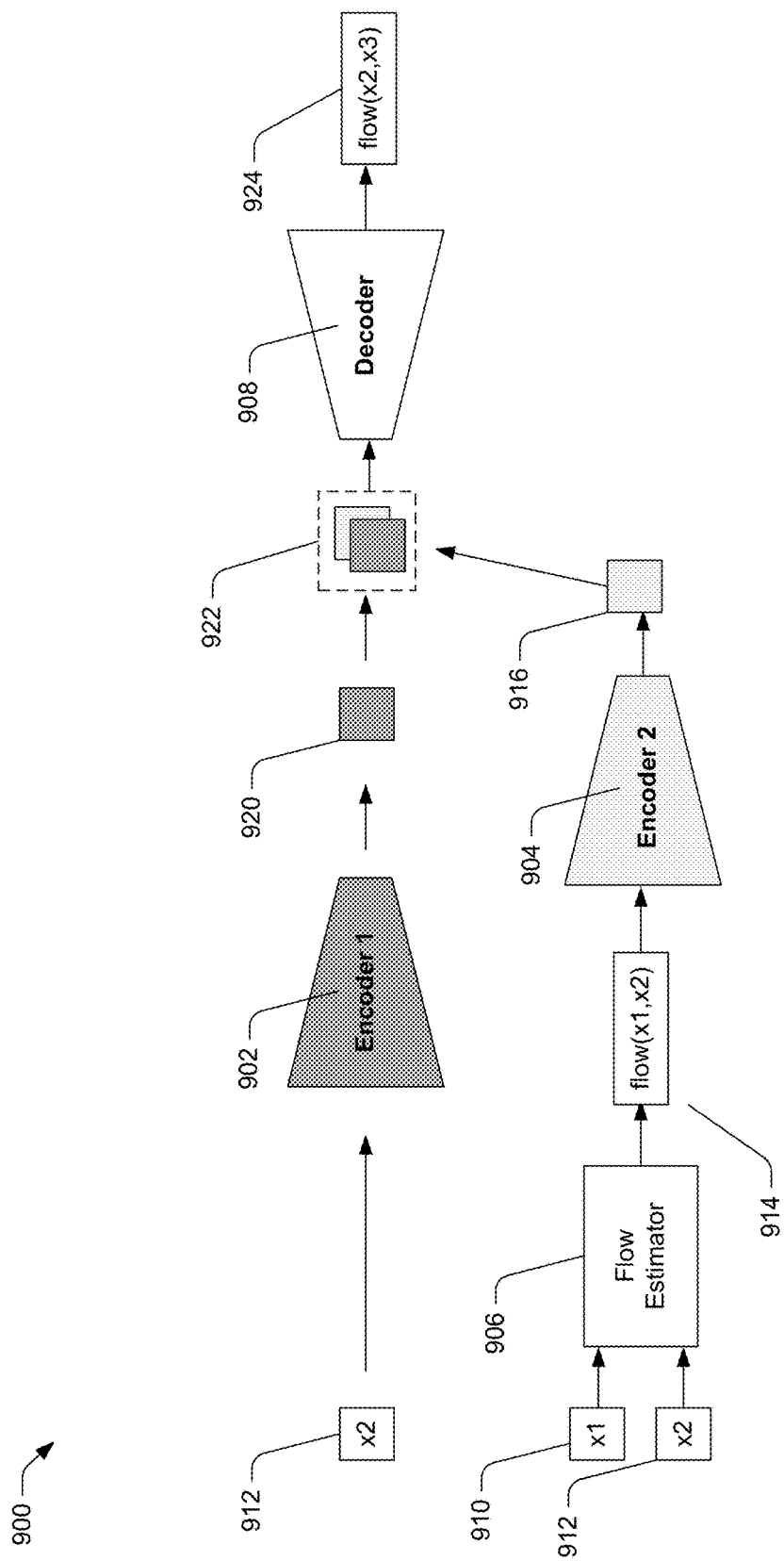
FIG. 9 illustrates an example in which the motion predictor of FIG. 7 is implemented as a deep convolutional neural network.

FIG. 9 illustrates an example 900 in which the motion predictor 702 of FIG. 7 is implemented as a deep convolutional neural network. In this example, the motion predictor 702 is implemented with a first encoder 902, a second encoder 904, a flow estimator 906, and a decoder 908.

A first frame 910 (x1) and a second frame 912 (x2), which is consecutive to first frame 910, are obtained by flow estimator 906. Flow estimator 906 extracts flow data 914 (e.g., motion) from the consecutive frames 910 and 912 of the video. The flow data 914 corresponds to a flow, or change, between the first frame 910 and the second frame 912 of the video, which is representative of motion of the video. In one or more implementations, the flow estimator 906 is a SpyNet flow estimator. SpyNet is a pre-trained network for flow estimation and is configured to extract the flow data 914 between x1 and x2, while eliminating the content information at the same time. In addition, since the SpyNet is network-based, this enables the entire convolutional neural network to remain as an end-to-end network. As there are no current ground truth (GT) flow maps on natural scene datasets, flow maps as GT using an existing flow estimation method such as SpyNet helps to minimize the L1 loss between the predicted flow and GT flow. However, as two pair of consecutive frames may have the same flow map, the second digital image frame (x2) is input to condition the predicted flow on the previous frame. Next, encoder 904 encodes the flow data 914 to generate flow features 916.

In a separate process, the first encoder 902 obtains the second frame 912 (x2), and extracts image features 920 from the second frame 912. The flow features 916 and digital image features 920 are concatenated to generate concatenated features 922, which are then fed into the decoder 908. The decoder 908 decodes the concatenated features 922 to generate flow data 924 corresponding to the next flow between frames x2,x3. In other words, flow data 924 corresponds to a predicted motion from frame x2 to a predicted frame x3.

Figure 10:
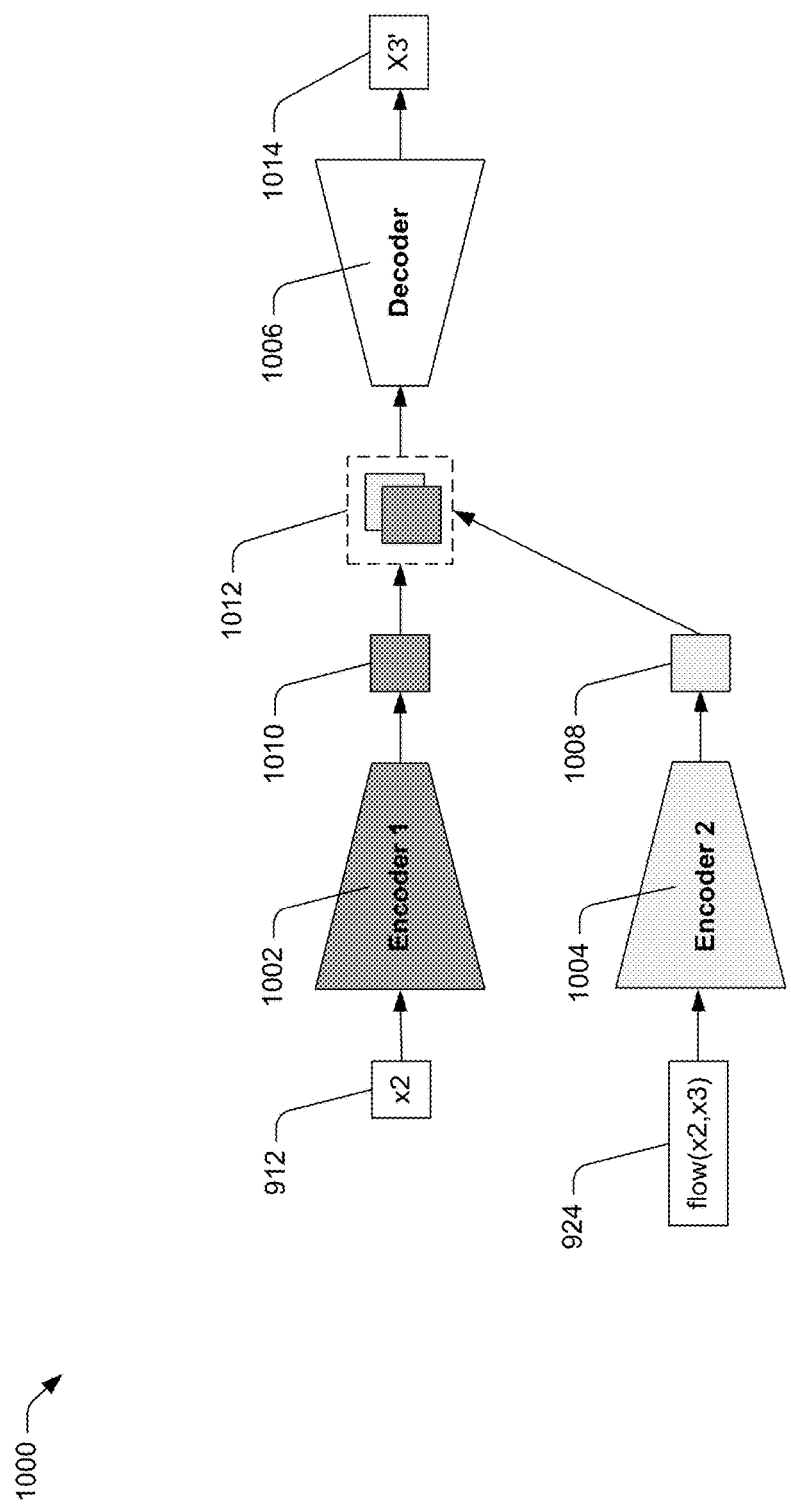
FIG. 10 illustrates an example in which the motion transferor of FIG. 7 is implemented as a deep convolutional neural network.

FIG. 10 illustrates an example 1000 in which the motion transferor 704 of FIG. 7 is implemented as a deep convolutional neural network. In this example, the motion transferor 704 is implemented with a first encoder 1002, a second encoder 1004, and a decoder 1006. Second encoder 1004 obtains the flow data 924 between x2 and x3 that was generated by motion predictor 702, as described in FIG. 9. The flow data 924 corresponds to a flow, or change, between the second digital image frame 912 and a predicted next digital image frame, which is representative of motion between the frames. Second encoder 1004 then encodes the flow data 924 to generate flow features 1008 from the flow data 924. In a separate process, the first encoder 1002 obtains the second frame 912 (x2), and extracts image features 1010 from the second frame 912.

Next, the flow features 1008 and image features 1010 are concatenated to generate concatenated features 1012, which are fed to the decoder 1006. The decoder 1006 decodes the concatenated features 1012 to generate a predicted next digital image frame 1014 (x3'). At the loss end, the standard L2 reconstruction loss and perceptual loss between the generated predicted next frame x3' and the ground truth x3.

Figure 11:
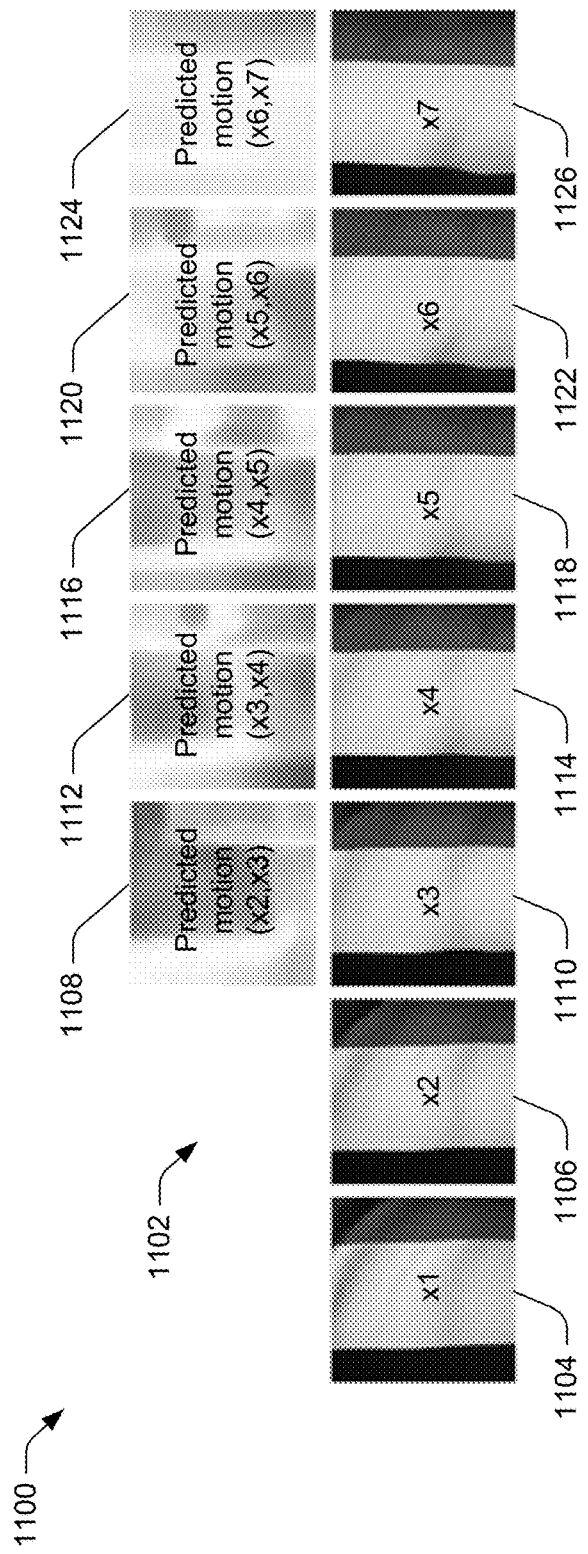
FIG. 11 illustrates an example of synthesizing future digital image frames given at least two initial digital image frames.

FIG. 11 illustrates an example 1100 of synthesizing future digital image frames given at least two initial digital image frames. In example 1100, at 1102 a first digital image frame 1104 and a second digital image frame 1106 are exposed to the motion transfer model. The first and second digital image frames, in this example, correspond to an image of a flag waving in the wind. To generate future frames based on the two starting frames, the motion predictor 702 of the motion transfer model generates predicted motion 1108, corresponding to the motion or flow between the second digital image frame 1106 and a predicted third digital image frame 1110. Notably, the third digital image frame 1110 has not yet been generated. Next, the motion transferor 704 transfers the predicted motion 1108 to the second digital image frame 1106 to generate the third digital image frame 1110.

This process may then be repeated for any desired number of next digital image frames. For example, in a next iteration, The motion predictor 702 of the motion transfer model generates predicted motion 1112, corresponding to the motion or flow between the third digital image frame 1110 and a predicted fourth digital image frame 1114. Notably, the third digital image frame 1114 has not yet been generated. Next, the motion transferor 704 transfers the predicted motion 1112 to the third digital image frame 1110 to generate the fourth digital image frame 1114. This process can then continue, by generating predicted motion 1116 and transferring the predicted motion 1116 to digital image frame 1114 to generate fifth digital image frame 1118, and then by generating predicted motion 1120 and transferring the predicted motion 1120 to digital image frame 1118 to generate sixth digital image frame 1122, and then by generating predicted motion 1124 and transferring the predicted motion 1124 to digital image frame 1122 to generate seventh digital image frame 1126.

FIG. 12 depicts an example procedure 1200 of synthesizing future digital image frames given at least two initial digital image frames. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks.

A first digital image frame and a second digital image frame are exposed to a motion transfer model that combines a motion predictor and a motion transferor, where the second digital image frame is consecutive to the first digital image frame (block 1202). By way of example, a first digital image frame 706 and a second digital image frame 708 are exposed to a motion transfer model 116 that combines a motion predictor 702 with a motion transferor 704.

A predicted motion between the second digital image frame and a next digital image frame is generated by the motion predictor based on the first digital image frame and the second digital image frame (block 1204). For example, the motion predictor 702 receives a first digital image frame 706 (x1) and a second digital image frame 708 (x2) and generates predicted motion 710 (x2,x3) between the second digital image frame and a next digital image frame, e.g., a third digital image frame (x3). To do so, a flow estimator of the motion predictor, extracts flow data between the first digital video frame and the second digital image frame, and a first encoder processes the flow data to generate motion features representing motion between the first digital video frame and the second digital video frame. In a separate process, the second digital image frame is processed by a second encoder of the motion predictor to generate image features of the second digital image. Then, the predicted motion between the second digital image file and the third digital image file is generated by combining the motion features with the image features. Thus, the predicted motion is conditioned on the second digital image frame.

The predicted motion is transferred, by the motion transferor, to the second digital image frame to generate a next digital image frame (block 1206). For example, the motion transferor 704 receives the predicted motion 710, and transfers the predicted motion 710 to the second digital image frame 708 to generate a next digital image frame 712, e.g., the third digital image frame (x3). To do so, an encoder of the motion transferor obtains the predicted motion 710 between x2 and x3 that was generated by motion predictor 702, and processes the predicted motion 710 to generate motion features representing motion between the second digital image frame and the next digital image frame 712 (x3). A different encoder of the motion transferor obtains the second digital image frame 708, and processes the second digital image frame 708 to generate image features of the second digital image frame 708. Then, the next digital image frame 712 is generated by combining the motion features with the image features of the second digital image frame to generate the next digital image frame 712. As discussed throughout, this process may be performed iteratively by the motion predictor and the motion transferor 704 to generate subsequent future digital image frames using previously generated future frames.

Example System and Device

Figure 13:
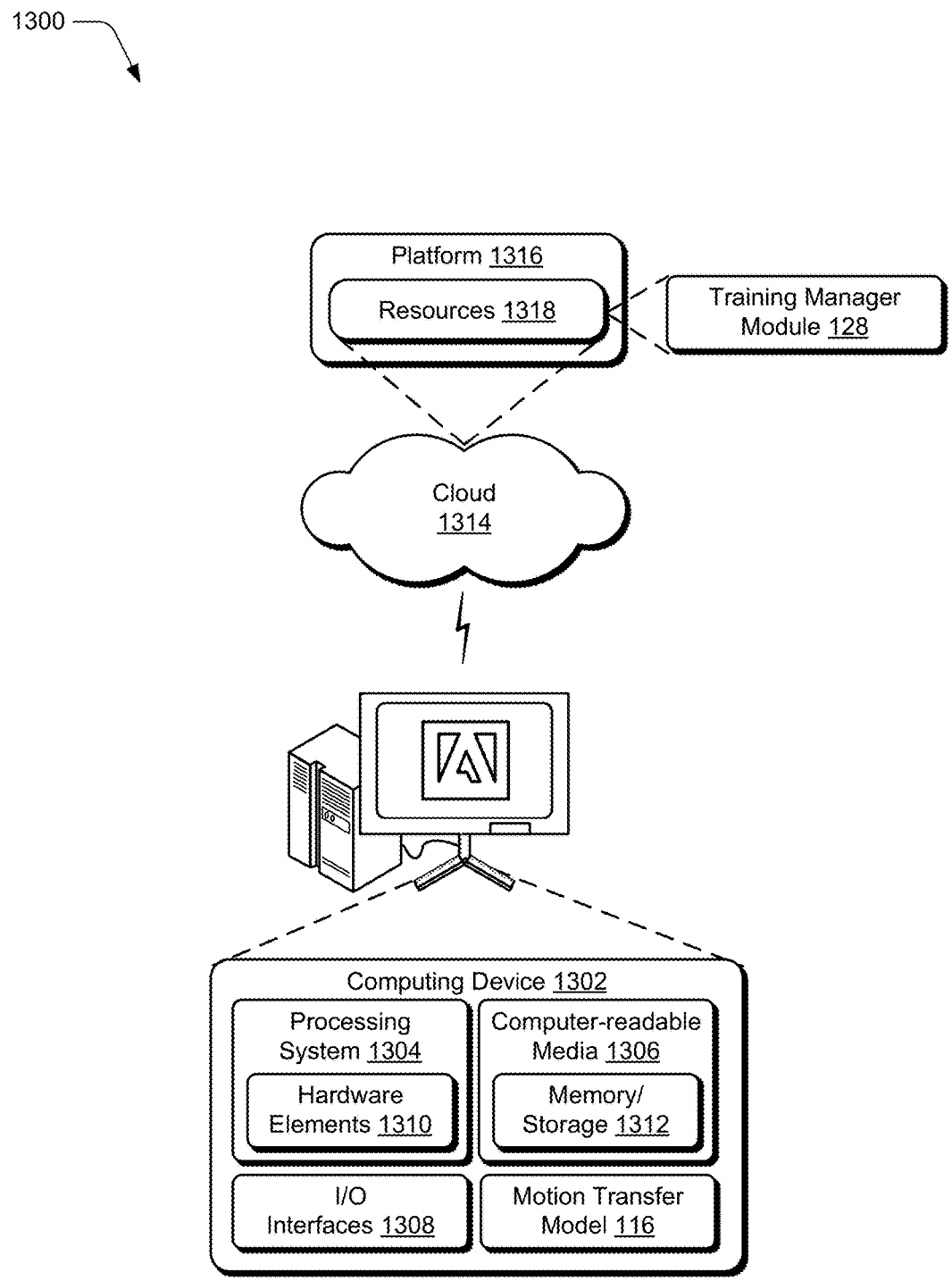
FIG. 13 illustrates an example system including various components of an example device that can be implemented as any type of computing device as described and/or utilized with reference to FIGS. 1-12 to implement the techniques described herein.

FIG. 13 illustrates an example system generally at 1300 that includes an example computing device 1302 that is representative of one or more computing systems and/or devices that may implement the various techniques described herein. This is illustrated through inclusion of the motion transfer model 116 and the training manager module 128. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interfaces 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware elements 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by at least one computing device, to transfer motion from a digital video to a digital image, the method comprising:
    exposing, by the at least one computing device, the digital image and at least a portion of the digital video to a motion transfer model that combines an image feature extractor, a flow estimator, and a motion feature extractor, the portion of the digital video comprising at least a first digital video frame and a second digital video frame that is consecutive to the first digital video frame;
    extracting, by the flow estimator, flow data between the first digital video frame and the second digital video frame;
    processing, by the motion feature extractor, the flow data to generate motion features representing motion between the first digital video frame and the second digital video frame;
    processing, by the image feature extractor, the digital image to generate image features of the digital image; and
    transferring motion of the digital video to the digital image by combining the motion features with the image features to generate a next digital image frame for the digital image.

2. The method as described in claim 1, wherein the combining comprises:
    concatenating the motion features with the image features to generate concatenated features in a high dimensional feature space; and
    decoding, by a decoder, the concatenated features to generate the next digital image frame for the digital video in a pixel space.

3. The method as described in claim 1, further comprising combining the digital image with the next digital image frame to form an animated sequence of digital images.

4. The method as described in claim 3, wherein the animated sequence of digital images comprises a GIF.

5. The method as described in claim 1, wherein the flow data does not include content of the digital video.

6. The method as described in claim 1, wherein the image feature extractor is implemented as a first neural network and the motion feature extractor is implemented as a second neural network.

7. A method as described in claim 1, wherein the digital video includes content that is visually similar to the digital image.

8. The method as described in claim 1, further comprising generating an additional next digital image frame for the digital image by:
    extracting, by the flow estimator, additional flow data between the second digital video frame and a third digital video frame;
    processing, by the motion feature extractor, the additional flow data to generate additional motion features representing motion between the second digital video frame and the third digital video frame;
    processing, by the image feature extractor, the generated next digital image frame to generate image features of the next digital image frame; and
    combining the additional motion features with the additional image features to generate the additional next digital image frame for the digital image.

9. The method as described in claim 1, wherein the motion transfer model is trained, using machine learning, to transfer motion between two consecutive frames of a reference digital video to a still frame of the same reference video.

10. A method implemented by at least one computing device to generate a next digital image frame from at least two initial digital image frames, the method comprising:
    exposing, by the at least one computing device, a first digital image frame and a second digital image frame that is consecutive to the first digital image frame to a motion transfer model that combines a motion predictor and a motion transferor;
    generating, by the motion predictor and based on the first digital image frame and the second digital image frame, predicted motion between the second digital image frame and a next digital image frame; and
    transferring, by the motion transferor, the predicted motion to the second digital image frame to generate the next digital image frame.

11. The method as described in claim 10, wherein the predicted motion is transferred to the second digital image frame to generate the next digital image frame by:
    extracting, by a flow estimator of the motion predictor, flow data between the first digital video frame and the second digital image frame;
    processing, by a first encoder of the motion predictor, the flow data to generate motion features representing motion between the first digital video frame and the second digital video frame;
    processing, by a second encoder of the motion predictor, the second digital image frame to generate image features of the second digital image; and
    generating the predicted motion between the second digital image frame and the next digital image frame by combining the motion features with the image features.

12. The method as described in claim 11, wherein predicted motion is transferred to the second digital image frame to generate the third digital image frame by:
    processing, by a third encoder of the motion transferor, the predicted motion between the second digital image frame and the third digital image frame to generate motion features representing motion between the second digital video frame and the third digital video frame;
    processing, by a fourth encoder of the motion transferor, the second digital image frame to generate image features of the second digital image frame; and
    generating the next digital image frame by combining the motion features with the image features of the second digital image frame.

13. The method as described in claim 12, wherein the combining the motion features with the image features of the second digital image frame to generate the next digital image frame comprises:
    concatenating the motion features with the image features to generate concatenated features in a high dimensional feature space; and decoding, by a decoder, the concatenated features to generate the next digital image frame in a pixel space.

14. The method as described in claim 10, wherein the first digital image frame and the second digital image frames comprise a portion of a digital video.

15. The method as described in claim 10, wherein the first digital image frame and the second digital image frames comprise at least a portion of a GIF.

16. A system comprising:
a motion transfer model that combines an image feature extractor, a flow estimator, and a motion feature extractor;
at least one processor; and
memory having stored thereon computer-readable instructions that are executable by the at least one processor to perform operations comprising:
exposing a digital image and at least a portion of a digital video to the motion transfer model, the portion of the digital video comprising at least a first digital video frame and a second digital video frame that is consecutive to the first digital video frame;
extracting, by the flow estimator, flow data between the first digital video frame and the second digital video frame;
processing, by the motion feature extractor, the flow data to generate motion features representing motion between the first digital video frame and the second digital video frame;
processing, by the image feature extractor, the digital image to generate image features of the digital image;
transferring motion of the digital video to the digital image by combining the motion features with the image features to generate a next digital image frame for the digital image; and
forming an animated sequence of digital images by combining the digital image with the next digital image frame in sequence.

17. The system of claim 16 as described in claim 1, wherein the combining the motion features with the image features comprises:
concatenating the motion features with the image features to generate concatenated features in a high dimensional feature space; and
decoding, by a decoder, the concatenated features to generate the next digital image frame for the digital video in a pixel space.

18. The system as described in claim 16, wherein the animated sequence of digital images comprises a GIF.

19. The method as described in claim 1, wherein the flow data does not include content of the digital video.

20. The method as described in claim 1, wherein the image feature extractor is implemented as a first neural network and the motion feature extractor is implemented as a second neural network.

* * * * *